United States Patent [19]
Yoshida

[11] Patent Number: 5,363,219
[45] Date of Patent: Nov. 8, 1994

[54] IMAGE PROCESSING METHOD AND APPARATUS

[75] Inventor: Tadashi Yoshida, Ichikawa, Japan

[73] Assignee: Canon Kabushiki Kaisha, Tokyo, Japan

[21] Appl. No.: 861,763

[22] Filed: Apr. 1, 1992

[30] Foreign Application Priority Data

Apr. 4, 1991 [JP] Japan ................. 3-071693

[51] Int. Cl.$^5$ ............... H04N 1/46; H04N 1/41
[52] U.S. Cl. ................. 358/539; 358/261.3; 358/433; 358/443
[58] Field of Search ......... 358/400, 442, 443, 448, 358/462, 467, 468, 500, 501, 539, 401, 426, 261.1, 261.2, 261.3, 432, 433; 382/41, 44, 54, 56

[56] References Cited

U.S. PATENT DOCUMENTS

| | | | |
|---|---|---|---|
| 4,412,186 | 10/1983 | Nagano | 330/288 |
| 4,628,534 | 12/1986 | Marshall | 382/41 |
| 4,887,151 | 12/1989 | Wataya | 358/80 |
| 4,924,509 | 8/1990 | Yokomizo | 382/50 |
| 4,937,681 | 6/1990 | Fujinawa et al. | 358/426 |
| 4,974,071 | 11/1990 | Maeda | 358/80 |
| 4,974,078 | 11/1990 | Tsai | 358/133 |
| 4,974,097 | 11/1990 | Kaneko et al. | 358/400 |
| 5,086,487 | 2/1992 | Katayama et al. | 382/56 |
| 5,089,884 | 2/1992 | Katayama et al. | 382/56 |
| 5,109,434 | 4/1992 | Shimizu et al. | 382/41 |

FOREIGN PATENT DOCUMENTS

| | | | |
|---|---|---|---|
| 395394 | 10/1990 | European Pat. Off. | H04N 1/417 |
| 3419693 | 11/1984 | Germany | H04N 1/00 |

OTHER PUBLICATIONS

Patent Abstracts of Japan, vol. 12, No. 469 (E-691) 63-190474.
Patent Abstracts of Japan, vol. 10, No. 233 (E-427) 61-065663.
"Progress in Multimedia Coding Standard", in Signal Processing of HDTV, II Proceedings of 3rd Intl. Workshop HDTV, Aug. 1989, pp. 431-443.

*Primary Examiner*—Bentsu Ro
*Attorney, Agent, or Firm*—Fitzpatrick, Cella, Harper & Scinto

[57] ABSTRACT

In a color facsimile apparatus, a color image file, or the like, an encoding system suitable for a color image to be transmitted is promptly selected and the image data is transmitted. The apparatus has: the color image input unit 20 to read a color image; a plurality of color image encode units 22 and 24 including the white/black image encoding; the storage units 23 and 25 to store the encode data; the means 28 and 29 for decoding the encode data; the means 32 for displaying the decoded image; and the protocol means 27 with an apparatus on the partner side.

24 Claims, 13 Drawing Sheets

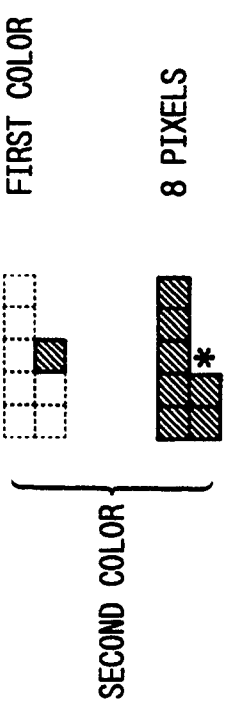
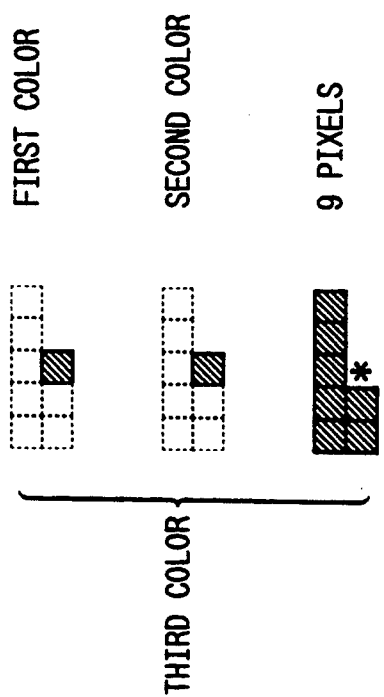
FIG. 4A  FIG. 4B  FIG. 4C

FIG. 12

| I | MC |
|---|---|
| 1 | 2 |
| 2 | 1 |
| 3 | 1 |
| 4 | 1 |
| 5 | 2 |
| 6 | 4 |
| 7 | 5 |
| 8 | 8 |
| 9 | 11 |
| 10 | 15 |
| 11 | 22 |
| 12 | 30 |
| 13 | 43 |
| 14 | 61 |
| 15 | 87 |
| 16 | 120 |
| 17 | 174 |
| 18 | 241 |
| 19 | 348 |
| 20 | 483 |

FIG. 13

| D | MPS | YN |
|---|---|---|
| 0 | 0 | 0 |
| 0 | 1 | 1 |
| 1 | 0 | 1 |
| 1 | 1 | 0 |

FIG. 14

| I | d=1 | | | | d=2 | | |
|---|---|---|---|---|---|---|---|
| | UPA=UPB=0 | UPA=1 | UPB=1 | | UPA=1 | UPB=1 | |
| | I' | I' | I' | EX | I' | I' | EX |
| 1 | 1 | 2 | 1 | 1 | 3 | 1 | 1 |
| 2 | 2 | 3 | 1 | 0 | — | — | — |
| 3 | 3 | 4 | 2 | 0 | 5 | 1 | 0 |
| 4 | 4 | 5 | 3 | 0 | — | — | — |
| 5 | 5 | 6 | 4 | 0 | 7 | 3 | 0 |
| 6 | 6 | 7 | 5 | 0 | — | — | — |
| 7 | 7 | 8 | 6 | 0 | 9 | 5 | 0 |
| 8 | 8 | 9 | 7 | 0 | — | — | — |
| 9 | 9 | 10 | 8 | 0 | 11 | 7 | 0 |
| 10 | 10 | 11 | 9 | 0 | — | — | — |
| 11 | 11 | 12 | 10 | 0 | 13 | 9 | 0 |
| 12 | 12 | 13 | 11 | 0 | — | — | — |
| 13 | 13 | 14 | 12 | 0 | 15 | 11 | 0 |
| 14 | 14 | 15 | 13 | 0 | — | — | — |
| 15 | 15 | 16 | 14 | 0 | 17 | 13 | 0 |
| 16 | 16 | 17 | 15 | 0 | — | — | — |
| 17 | 17 | 18 | 16 | 0 | 19 | 15 | 0 |
| 18 | 18 | 19 | 17 | 0 | — | — | — |
| 19 | 19 | 20 | 18 | 0 | 21 | 17 | 0 |
| 20 | 20 | 21 | 19 | 0 | — | — | — |
| 21 | 21 | 21 | 20 | 0 | 21 | 19 | 0 |

"—"···DON'T CARE

FIG. 15

| I | EFFECTIVE PROBABILITY $q_e$ | COEFFICIENT | | ENCODE PARAMETER | | |
|---|---|---|---|---|---|---|
| | | $q_1$ | $q_2$ | $Q_1$ | $Q_2$ | $Q_3$ |
| 1 | 0.5000 | $2^{-2}$ | $2^{-2}$ | 2 | 2 | + |
| 2 | 0.4375 | $2^{-1}$ | $-2^{-4}$ | -1 | 4 | - |
| 3 | 0.3750 | $2^{-2}$ | $2^{-3}$ | 2 | 3 | + |
| 4 | 0.3125 | $2^{-2}$ | $2^{-4}$ | 2 | 4 | + |
| 5 | 0.2500 | $2^{-3}$ | $2^{-3}$ | 3 | 3 | + |
| 6 | 0.1875 | $2^{-3}$ | $2^{-4}$ | 3 | 4 | + |
| 7 | 0.1250 | $2^{-4}$ | $2^{-4}$ | 4 | 4 | + |
| 8 | 0.0938 | $2^{-4}$ | $2^{-5}$ | 4 | 5 | + |
| 9 | 0.0625 | $2^{-5}$ | $2^{-5}$ | 5 | 5 | + |
| 10 | 0.0469 | $2^{-5}$ | $2^{-6}$ | 5 | 6 | + |
| 11 | 0.0313 | $2^{-6}$ | $2^{-6}$ | 6 | 6 | + |
| 12 | 0.0234 | $2^{-6}$ | $2^{-7}$ | 6 | 7 | + |
| 13 | 0.0156 | $2^{-7}$ | $2^{-7}$ | 7 | 7 | + |
| 14 | 0.0117 | $2^{-7}$ | $2^{-8}$ | 7 | 8 | + |
| 15 | 0.0078 | $2^{-8}$ | $2^{-8}$ | 8 | 8 | + |
| 16 | 0.0059 | $2^{-8}$ | $2^{-9}$ | 8 | 9 | + |
| 17 | 0.0039 | $2^{-9}$ | $2^{-9}$ | 9 | 9 | + |
| 18 | 0.0029 | $2^{-9}$ | $2^{-10}$ | 9 | 10 | + |
| 19 | 0.0020 | $2^{-10}$ | $2^{-10}$ | 10 | 10 | + |
| 20 | 0.0015 | $2^{-10}$ | $2^{-11}$ | 10 | 11 | + |
| 21 | 0.0010 | $2^{-11}$ | $2^{-11}$ | 11 | 11 | + |

IMAGE PROCESSING METHOD AND APPARATUS

BACKGROUND OF THE INVENTION

1. Field of the Invention

The invention relates to image processing method and apparatus in, for instance, an image communicating apparatus, an image storing apparatus, or the like.

2. Related Background Art

Hitherto, with respect to the color still image encoding system, various systems have been proposed in U.S. Pat. Nos. 4,887,151 and 4,974,071 and U.S. patent application Ser. Nos. 07/362,014, 07/514,766 and 07/577,312. In those systems, a color still image as an object to be encoded is mainly classified to the following two kinds of images.

(1) Binary color image in which eight colors of red, green, blue, cyan, magenta, yellow, white, and black are handled as binary data.

(2) Multilevel color image in which red, green, and blue are displayed by 16,700,000 colors on the basis of, for example, every 256 gradations.

As a binary color image encoding system, there is considered a system in which a Modified Huffman system as a variable length encoding system which is at present used in a facsimile apparatus or the like is used every color. As another method, a predictive encoding system in which an encode pixel is predicted from peripheral pixels is also proposed. The above methods are included in the classification of the reversible encoding and data in the encoding/decoding is preserved.

On the other hand, as a multilevel color image encoding system, there is proposed a system such that after the 8-bit signal regarding each of R, G, and B was converted into the luminance/chrominance signal, coefficient values which have been subjected to the orthogonal transformation (discrete cosine transformation) are subjected to the linear quantization, and the resultant quantization values are variable length encoded. According to such a system, fundamentally, the components on the low frequency side of the spatial frequency of an image are left and the components on the high frequency side are cut, thereby reducing the image data. This method relates to the irreversible encoding system and there is a trade-off relation between the compression ratio and the deterioration of the picture quality.

Both of the above systems have the following merits and demerits.

(1) According to the binary color system, a color image which is expressed by eight colors or an image which can be sufficiently approximated by eight colors, for instance, a color document or the like can be encoded at a high compression efficiency without deterioration. In the case of encoding a color multilevel image, however it is necessary to binarize each color as a preprocess and, particularly, a color photograph or the like needs to be binarized by a dither method, an error diffusion method, or the like in order to express halftones. There is a drawback such that in the case where a color image binarized by such a method is encoded by a binary reversible encoding, a compression ratio is low.

(2) According to the multilevel color system, contrarily, a compression efficiency in the encoding of a color photograph or the like is high because the image is compressed by mainly reducing the high frequency components of the image. However, since the image such as color sentences or the like which can inherently be expressed by binary data or several colors is handled as a multilevel image, the image of an edge portion such as a character or the like including the high frequency components remarkably deteriorates due to the compression and a high compression efficiency cannot be expected.

There are the following problems in the case of applying the above color image encoding system to a color still image communicating apparatus such as a color facsimile apparatus or the like. First, since both of the above systems relate to the variable length encoding system, a data amount of the transmission image is obscure until the end of encoding. Second, since images of good compression efficiencies are different in both of the systems, it is necessary to select either better one of the systems in accordance with the image. Further, the type of encoding system which can be decoded on the image decoder side of the transmission partner needs to be known before the transmission.

SUMMARY OF THE INVENTION

The invention is made in consideration of the circumstances as mentioned above and it is an object of the invention to provide image processing method and apparatus which can efficiently transmit image data.

To accomplish the above object, according to the invention, there is disclosed an image encoding apparatus comprising: input means for inputting image data representing an original; first encoding means for encoding the image data as binary image data representing the original; second encoding means for encoding the image data as multilevel image data representing the original; selecting means for selecting one of the image data encoded by the first or second encoding means; and transmitting means for transmitting the image data selected by the selecting means.

There is also disclosed an image encoding apparatus comprising: input means for inputting image data representing an original; first encoding means for encoding the image data as binary image data representing the original; second encoding means for encoding the image data as multi level image data representing the original; and memory means for simultaneously storing the image data encoded by the first and second encoding means.

Another object of the invention is to use a proper encoding method in accordance with an image as an object to be encoded.

To accomplish the above object, according to the invention, there is disclosed an image encoding apparatus comprising: input means for inputting color image data representing an original; first encoding means for encoding the image data as color image data representing the original; second encoding means for encoding the image data as monochromatic image data representing the original; memory means for simultaneously storing the image data encoded by the first and second encoding means; selecting means for selecting one of the image data encoded by the first or second encoding means and stored in the memory means; and transmitting means for transmitting the image data selected by the selecting means.

Still another object of the invention is to provide an encoding apparatus having a high operating efficiency.

Further another object of the invention is to provide a communicating method of a high efficiency.

The above and other objects and features of the present invention will become apparent from the following detailed description and the appended claims with reference to the accompanying drawings.

BRIEF DESCRIPTION OF THE DRAWINGS

FIGS. 4A to 4C are diagrams showing reference pixel positions;

FIG. 12 is a diagram showing the relation between the number MC of more priority symbols MPS and the index I;

FIG. 13 is a diagram showing the input/output relation of an EX-OR circuit;

FIG. 14 is a table showing an index updating method; and

FIG. 15 is a diagram to select an effective probability.

DETAILED DESCRIPTION OF THE PREFERRED EMBODIMENTS

It is an object of an embodiment of the invention which will be explained hereinbelow to compress and transmit a color image by an encoding system suitable for the image. The embodiment has first encoding means and second encoding means for encoding a color image, wherein the color image to be encoded is simultaneously encoded by both of the systems, thereby obtaining the encode data. After that, the encoding system which is optimum to the encoded color image is selected and the color image is transmitted. After the color image was encoded by both of the systems, the encoding ability on the reception side is confirmed by a protocol and the proper encode data is subsequently transmitted, so that the image can be promptly transmitted. Before the encode data is transmitted, the user can also confirm the code length and select the code data to be transmitted. By decoding both of the codes on the transmission side, a degree of deterioration of the color image can be also confirmed.

A preferred embodiment of the invention will practically be described hereinbelow.

Figure 1:
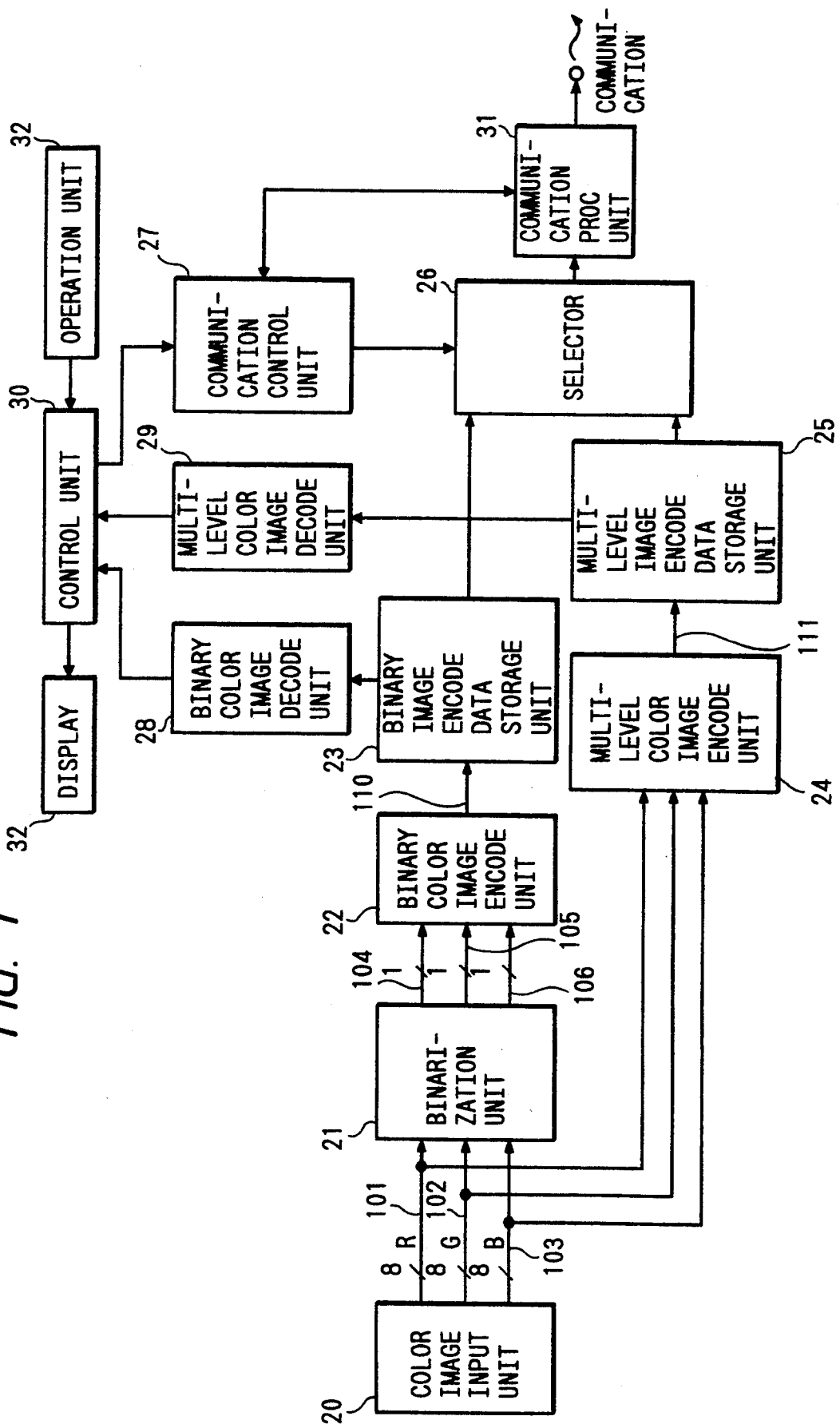
FIG. 1 is a diagram showing an example of a construction of an encode unit to which the invention is applied.

FIG. 1 shows a construction of an embodiment of an encode unit to which the invention is applied.

Reference numeral 20 denotes a color image input unit. For instance, a color image is scanned by a color scanner or the like and multilevel color image signals each comprising eight bits of red (R), green (G), and blue (B) indicative of a full color image are supplied to signal lines 101, 102, and 103, respectively. A host computer, a video camera, or the like can be also used as a color image input unit 20. Reference numerals 21, 22 and 23 denote a section to form a binary color encode unit. Reference numeral 21 denotes the binarization unit to convert the data of R, G, and B each consisting of eight bits into the data each consisting of one bit every color. Reference numeral 22 denotes the binary color image encode unit to encode the binarized RGB data. The RGB signals 101, 102, and 103 supplied from the color image input unit 20 are converted into the RGB signals each consisting of one bit by the binarization unit and, thereafter, they are compressed and encoded by the binary color image encode unit, thereby forming a binary code bit stream 110.

The code data is stored into the binary image encode data storage unit 23 and is held until the image signal is transmitted. An auxiliary storage device such as a hard disk or the like is used as a storage unit 23.

The 8-bit output signals of R, G, and B colors form the color image input unit 20 are also supplied to a multilevel color image encode unit 24 and encoded. In the encode unit 24, they are compressed and encoded by a DCT conversion encoding in a state of the multilevel data and stored into a multilevel image encode data storage unit 25. As mentioned above, both of the binary image code data and the multilevel image code data are simultaneously formed from the same color image by the two kinds of encode units 22 and 24. When the image is transmitted, either one of the two kinds of code data is selected. In the embodiment, from the encode data stored in the binary image code data storage unit 23 and the multilevel image data storage unit 25, color images are reconstructed by a binary color image decode unit 28 and a multilevel color image decode unit 29, respectively. By displaying the decoded images onto a display 31 by a control unit 30, a picture quality of the image to be transmitted can be known. At the same time, a communication control unit 27 executes a communication protocol to a transmission partner, thereby checking the decoding ability on the reception side. When the reception side has an ability enough to decode any of the binary image code data and the multilevel image code data, the operator can select and transmit either one of the images by an operation unit 32. When the reception side has a decoding ability of only either one of them, the image to be transmitted is indicated to the operator and, after that, it is sent from a communication processing unit 31 to a digital line (not shown) such as an ISDN or the like. The protocol is based on the well-known G4 protocol.

As a processing method which is used in the binarization unit 21, either one of the simple binarization, dither process, and error diffusion process can be selected. Since those binarizing processes are well known, their descriptions are omitted here.

Figure 2:
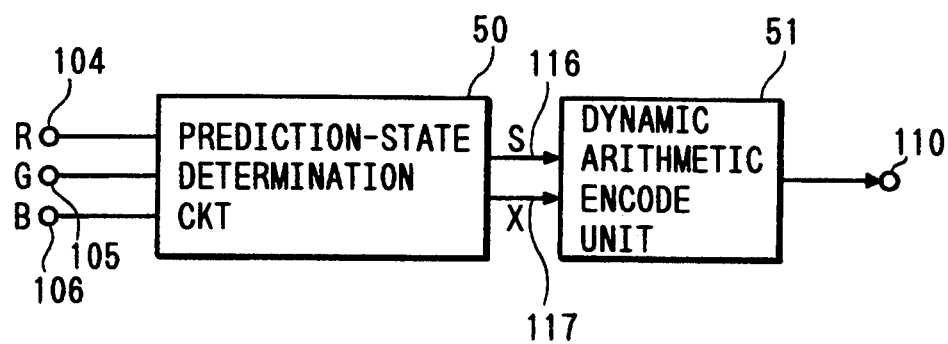
FIG. 2 is a block diagram showing a binary color image encode unit.

FIG. 2 is a block diagram of the binary color image encode unit 22. An R signal 104, a G signal 105, and a B signal 106 as binarized outputs from the binarization unit 21 (FIG. 1) are supplied to a prediction state determination circuit 50.

The prediction state determination circuit 50 generates a prediction state signal S116 comprising peripheral encoded pixels around a target pixel and also generates a 1-bit pixel signal X117 synchronized with the prediction state signal S116. Those two signals S116 and X117 are encoded in a dynamic arithmetic encode unit 51, so that the binary image code data 110 is generated.

Figure 3:
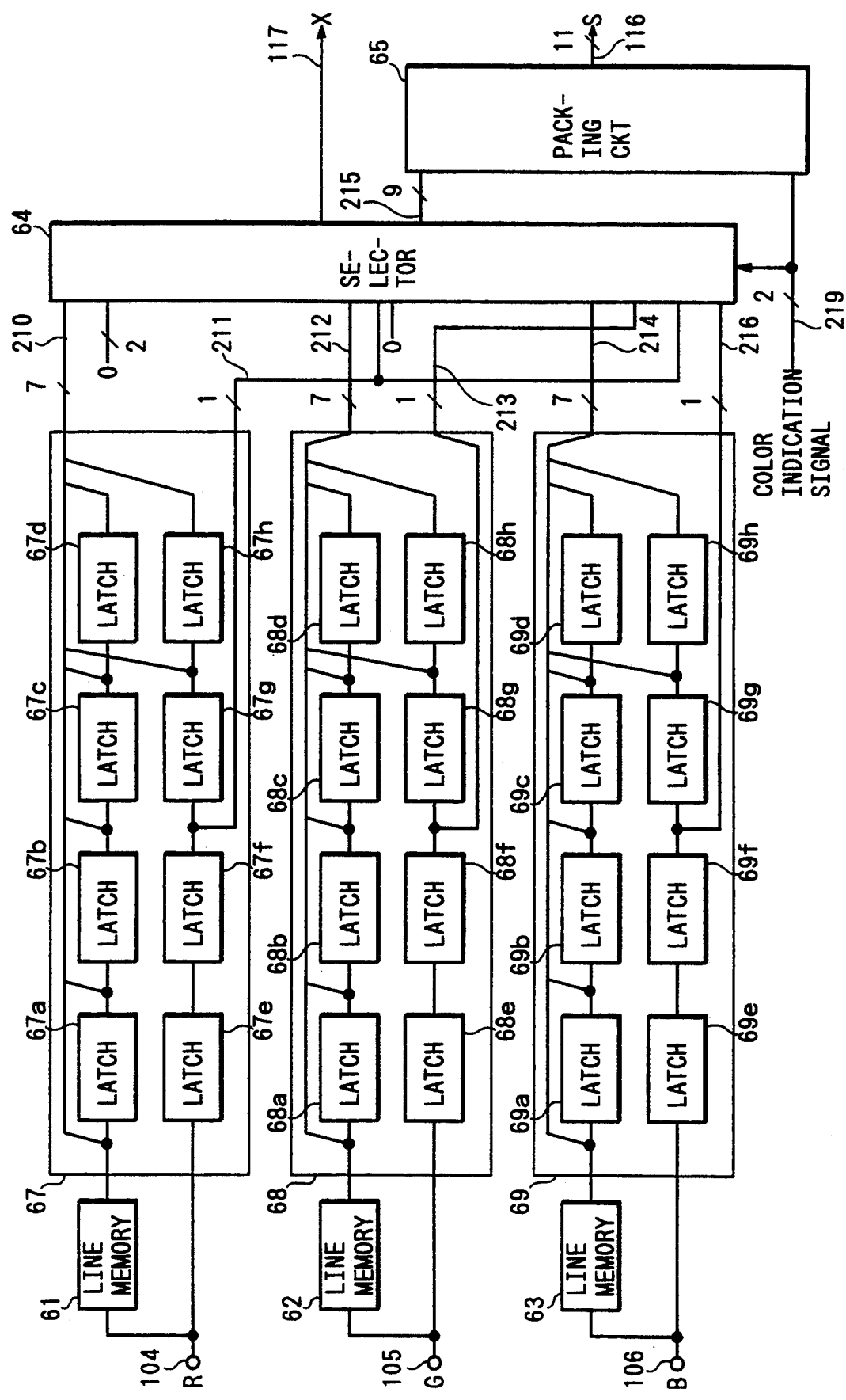
FIG. 3 is a block diagram of a prediction state determination circuit.

FIG. 3 is a block diagram of the prediction state determination circuit 50. FIGS. 4A to 4C show pixel positions of respective colors which are referred for state prediction.

That is, FIG. 4A shows reference pixels of the first color (R in the embodiment) to be encoded and means that seven peripheral encoded pixels around the encode pixel indicated by "*" are referred.

FIG. 4B shows reference pixels of the second color (G in the embodiment) for encoding and means that total eight pixels comprising the seven pixels similar to those shown in FIG. 4A and the pixel at the same position as that of the first color are referred.

FIG. 4C shows reference pixels of the third color (B in the embodiment) and means that total nine pixels comprising the seven pixels similar to those shown in FIG. 4A and the pixels at the same positions as those of the first and second colors are referred.

In the construction shown in FIG. 3, a state of each color is determined by referring to a plurality of pixels locating at the reference pixel positions of every color shown in FIGS. 4A to 4C. The operation of FIG. 3 will now be described hereinbelow.

The binarized image signals 104, 105, and 106 of R, G, and B each consisting of one bit are supplied to latches 67 to 69 and to line memories 61 to 63. The R, G, and B data delayed by one line are held by the line memories 61 to 63. The data delayed every one pixel clock are held in latches 67a to 67h, 68a to 68h, and 69a to 69h, respectively.

In the latch group 67, the data of vie pixels on the preceding line of the encode line can be referred by the outputs in the latches 67a to 67d into which the outputs of the line memory 61 are supplied and by the output of the line memory 61. On the other hand, the two encoded pixels on the encode line can be referred by the outputs in the latches 67g and 67h. The data of those seven pixels assumes a reference pixel signal 210 for determination of the state of R as a first color for encoding. Data 211 of R of the encode pixel is generated from the latch 67f in order to determine states of the other colors G and B.

The latch groups 68 and 69 having substantially the same construction as the latch group 67 are provided for data G105 and B106. Data of seven pixels similar to that of the latch group 67 are generated as reference pixel signals 212 and 214 from the latch groups 68 and 69, respectively.

Data 213 of G of the encode pixels is generated from the latch 68f in the latch group 68 in order to determine a state of B.

A selector 64 switches the reference pixel signals in accordance with a color indication signal 219 of two bits indicative of the color corresponding to the output of each color data of R, G, and B. That is, when the color indication signal 219 indicates R, the reference pixel signal 210 and a zero signal of two bits are selected. When the signal 219 indicates G, the reference pixel signal 212, R signal 211, and zero signal of one bit are selected. In the case of B, the reference pixel signal 214, R signal 211, and G signal 213 are selected. A selection signal 215 of nine bits and the color indication signal 219 of two bits are combined to a signal of eleven bits by a packing circuit 65 and becomes the prediction state signal S116. Therefore, a state signal $S_1$ indicates the color of the pixel to be encoded and the peripheral state and shows $2^7$ states, $2^8$ states, and $2^9$ states for the colors of R, G, and B, respectively.

The pixel signals which are synchronized with the prediction states of the respective colors of R, G, and B and which should be encoded are generated from R211, B213, and G216 and are selected by the selector 64 in accordance with the color indication signal 219, so that the pixel signal X117 is generated.

Figure 5:
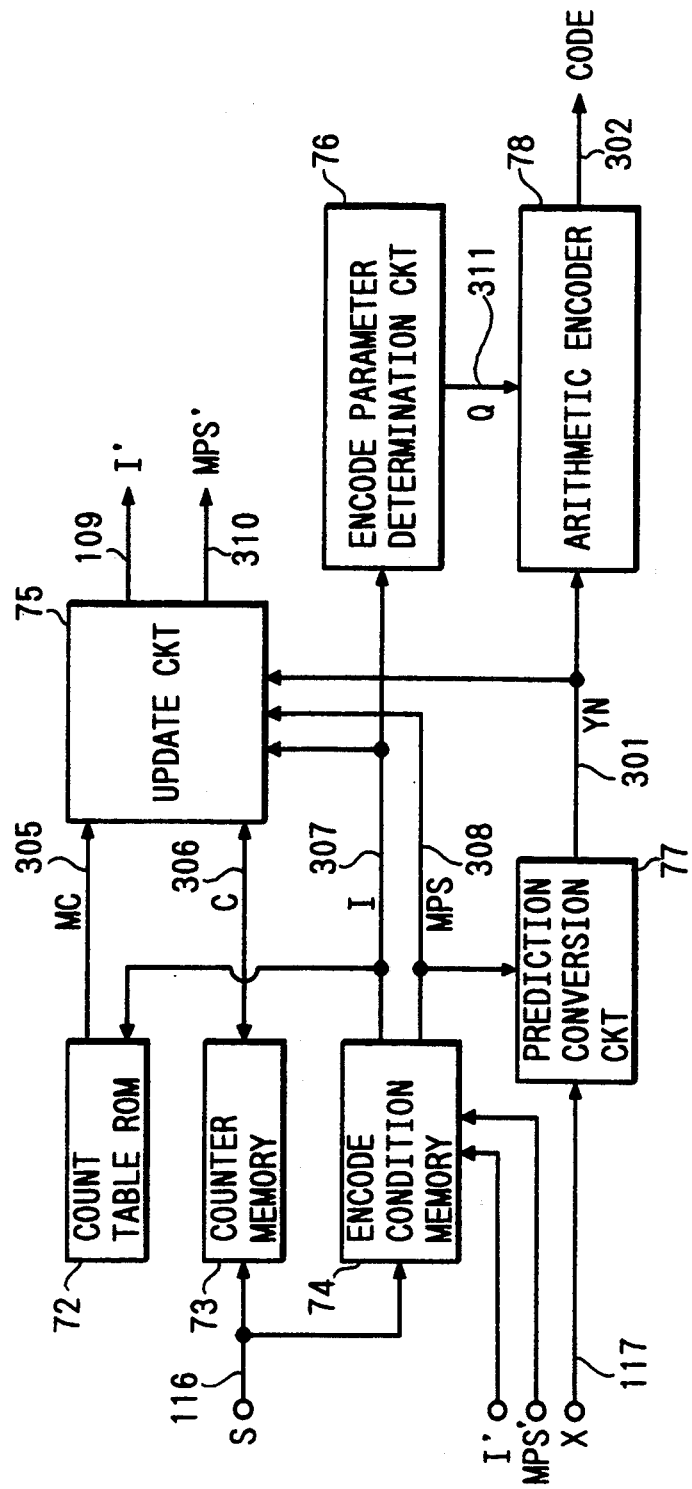
FIG. 5 is a block diagram of a dynamic encoder.

FIG. 5 is a block diagram of the dynamic arithmetic encode unit 51 shown in FIG. 2.

Prior to explaining FIG. 5, the arithmetic signal used in the embodiment will now be described.

As is well known hitherto, the arithmetic code is based on a method whereby a code is formed by an arithmetic operation in a manner such that an input signal train becomes a code which is expressed by decimal binary number. Such a method is proposed in the literature by Langdon, Rissanen, et. al., "Compression of Black/White Images with Arithmetic Coding", IEEE Transaction Com. COM-29, Jun. 6, 1981, or the like. According to such a literature, when it is not assumed that the encoded input signal train is set to S and a probability of the appearance of a less priority symbol (LPS) is set to q and an operation register Augend is set to A(S) and a code register is set to C(S), the following arithmetic operations are executed every input signal.

$$A(S1) = A(S) \times q \approx A(S) \times 2^{-Q} \quad (1)$$

$$A(S0) = <A(S)-A(S1)>1 \quad (2)$$

$<>1$ denotes that the effective digit of one bit is truncated.

$$C(S0) = C(S) \quad (3)$$

$$C(S1) = C(S) + A(S0) \quad (4)$$

In the case where the encode data indicates a more priority symbol (MPS: 0 in the above example), $A(S_0)$ and $C(S_0)$ are used to encode the next data. In the case of the less priority symbol (LPS: 1 in the above example), $A(S_1)$ and $C(S_1)$ are used to encode the next data.

The value of new A is increased by $2^S$ times (S is an integer of 0 or more) and is set to a value within a range of $0.5 \leq A < 1.0$. The above process corresponds to that the arithmetic register A is shifted S times in the hardware. The code register C is also shifted by the same number of times and the shifted-out signal becomes the code. The code is formed by repeating the above processes.

On the other hand, by approximating an appearance probability q of LPS by the power of $2(2^{-Q}$: Q is a positive integer) as shown in the equation (1), the multiplying calculation is replaced to the shift arithmetic operation. To further preferably approximate, q is approximated by the polynomial of the power of 2 as shown in, for instance, the equation (5). An efficiency worst point is improved by such approximation.

$$q \approx 2^{-Q_1} + 2^{-Q_2} \quad (5)$$

As for the arithmetic code, since the value of Q can be switched every encode data, a probability presuming section can be separated from the encoding.

The embodiment uses a dynamic method whereby a probability is presumed while encoding as mentioned above.

A block diagram of the dynamic arithmetic encode unit of FIG. 5 to perform the foregoing arithmetic encoding will now be described.

The state signal S116 from the packing circuit 65 shown in FIG. 3 is supplied to a counter memory 73 and an encode condition memory 74.

A more priority symbol MPS 308 as a symbol which can easily appear and an index I307 indicative of the encode condition including an appearance probability of the LPS of the arithmetic code, which will be explained hereinlater, are stored in the encode condition memory 74 every state which is expressed by the state signal S116. The MPS 308 read out from the memory 74 in accordance with the color and state of the image to be encoded is supplied to a prediction conversion circuit 77. The prediction conversion circuit 77 forms a YN signal 301 which is set to 0 when the serial pixel signal X117 from the selector 64 shown in FIG. 3 coincides with the MPS 308. The YN signal 301 is supplied to an update circuit 75. The update circuit 75 increases a count value in a corresponding state among the count values stored in the counter memory 73 when the YN signal is equal to 0. When a count value C306 stored in the counter memory 73 coincides with a set value MC305 from a count table ROM 72, the count value is updated in such a direction as to increase the index I307 (direction as to decrease the appearance probability q of the LPS) (in this case, the MPS is not inverted).

The count table ROM 72 supplies the number MC305 of MPSs shown in FIG. 12 which has been predetermined in correspondence to an index I representing the appearance probability q of the LPS to he update circuit 75.

The update circuit 75 updates the count value in such a direction as to reduce the index I307 (direction as to increase the appearance probability q of the LPS) when the MPS 308 and the pixel signal X117 are different, that is, when the YN signal from the prediction conversion circuit 77 is equal to 1. When the YN signal whose value is equal to 1 is given in the case where the index is equal to 1, a process to invert the MPS (0 →1 or 1 →0) is executed. Outputs I' 309 and MPS' 310 of the update circuit 75 denote the values of the index after updating and are again stored into the encode condition memory 74.

An encode parameter determination circuit 76 sets an encode parameter Q311 of the arithmetic code into an arithmetic encoder 78 on the basis of the value of the index I307. The arithmetic encoder 78 arithmetically encodes the YN signal 301 from the prediction conversion circuit 77 by using the parameter Q311, thereby obtaining a code 302.

A static encoding can be easily realized by a method whereby an initial value is preliminarily given to the encode condition memory 74 and I and MPS are not updated.

Figure 6:
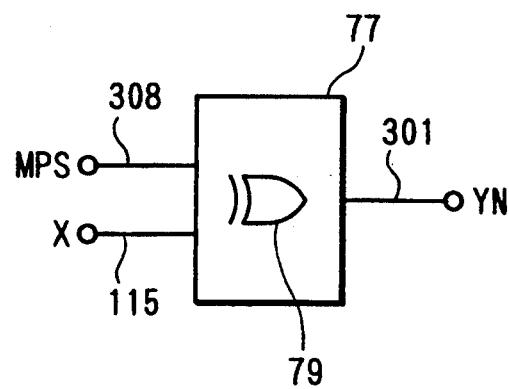
FIG. 6 is a block diagram of a prediction conversion circuit.

FIG. 6 is a block diagram of the prediction conversion circuit 77. The serial pixel signal X117 and the MPS 308 are supplied to an EX-OR circuit 79. The EX-OR circuit 79 generates the YN signal 301 is set to 0 when the serial pixel signal X117 and the MPS 308 coincide and which is set to 1 when they differ in accordance with logic expressions of FIG. 13.

Figure 7:
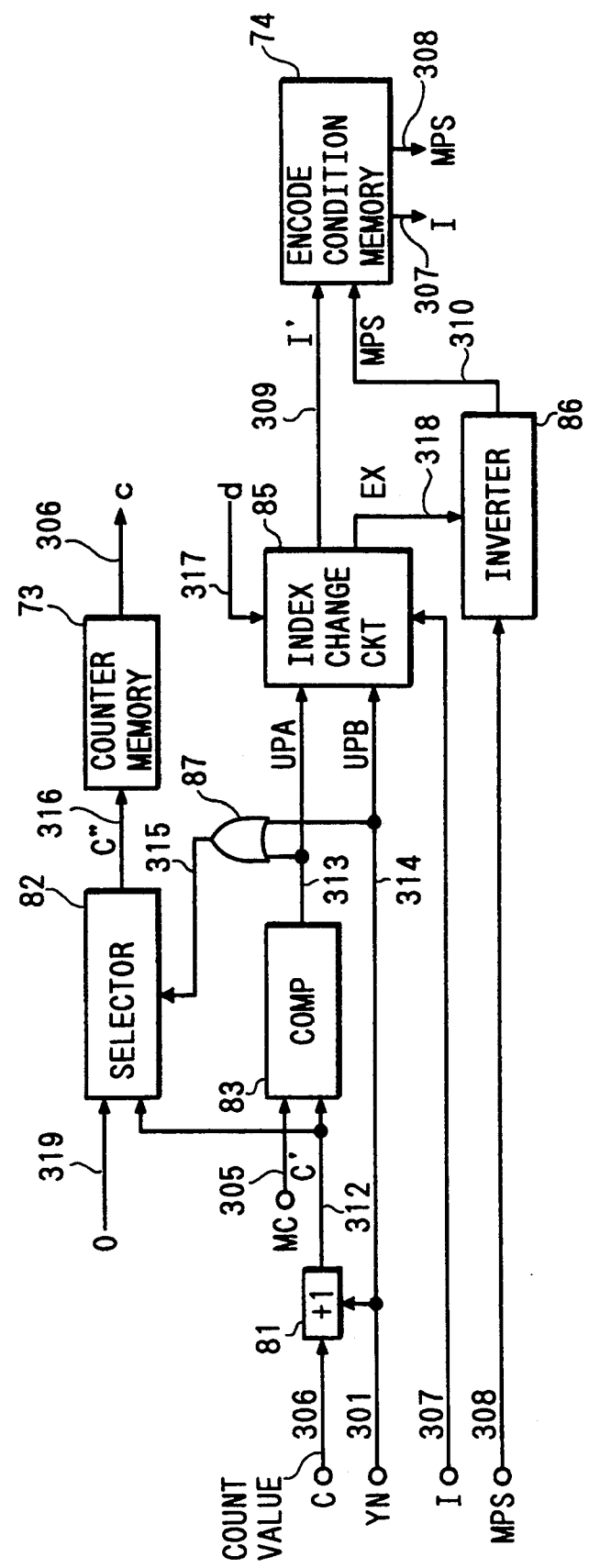
FIG. 7 is a block diagram of an update circuit.

FIG. 7 is a block diagram of the update circuit 75. When the YN signal 301 is equal to 0, the count value C306 from the counter memory 73 is increased by +1 by an adder 81, so that a signal C' 312 is derived. The value of the signal C' 312 is compared with the MC305 from the count table ROM 72 by a comparator 83. When the value of C' coincides with the value of MC, an update signal UPA 313 is set to 1. The YN signal 301 becomes an update signal UPB 314. The signals UPA and UPB are supplied to an index change circuit 85. The OR of UPA and UPB is calculated by an OR circuit 87. An output signal 315 of the OR circuit 87 is used as a switching signal of a selector 82. The selector 82 selects a 0 signal 319 to reset the value of the counter memory 73 when the signal 315 is equal to 1. In the other cases, the selector 82 selects the output signal C' 312 of the adder 81. The selector 82 generates the selected signal as a counter update signal C'' 316 and stores into the counter memory 73. Therefore, when the serial pixel signal X117 and the MPS 308 are different and when a state in which they coincide continues a predetermined number of times, the count value of the counter memory 73 is reset.

A signal d317 (d =1 as a standard value) to control the update slice levels of the index, UPA 313, UPB 314, and present index I307 from the encode condition memory 74 are supplied to the index change circuit 85.

FIG. 14 is a table showing an index updating method in the index change circuit 85 (FIG. 14 shows two cases where the update slice levels are d =1 and d =2). The updated index I' is determined by referring to the table on the basis of the present index I, update slice condition d, UPA, and UPB. When I =1 and UPB =1 (the case where the serial pixel signal X117 and the MPS 308 are different), an EX signal 318 is set. When the EX signal 318 is equal to 1, an inverter 86 inverts the symbol of the present MPS 308 (0 →1 or 1 →0), thereby obtaining the update MPS' 310. When the EX signal is equal to 0, the MPS' is not changed. The updated I' 309 and the MPS' 310 are stored into the encode condition memory 74 and are used as an index I and an MPS for the next process. The updating method shown in FIG. 14 can be also constructed by a table using an ROM or the like or can be also realized by a logic construction using adders and subtracters.

As mentioned above, when the MPSs of the number which is equal to a predetermined number of MPSs according to the value of the index I representing the appearance probability q of the LPS which has been approximated by the polynomial of the power of 2 are generated, the value of d is added to the value of index I, thereby reducing the appearance probability q of the LPS which is used in the arithmetic code. On the other hand, when LPSs are generated, d is subtracted from the index I, thereby increasing the appearance probability q of LPS which is used in the arithmetic code. Further, when LPSs are generated in a state showing that the appearance probability q of LPS is equal to 0.5 (state in which the index I is equal to 1), the MPS is inverted.

As mentioned above, by updating the index I and the MPS adaptively to the input image, the arithmetic encoding of a high encoding efficiency can be accomplished.

Figure 8:
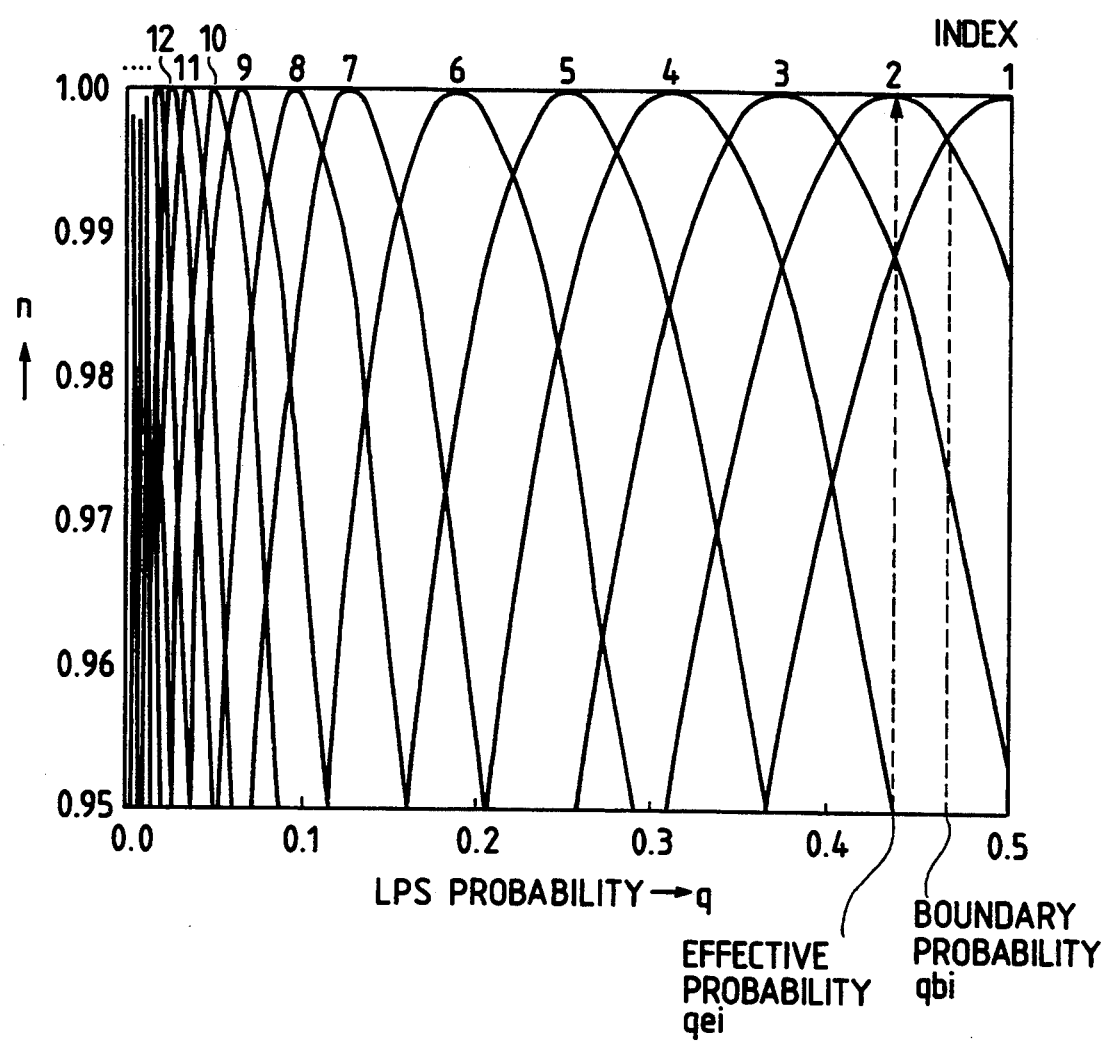
FIG. 8 is a diagram showing encoding efficiency curves.

FIG. 8 shows encoding efficiency curves of the arithmetic code which is used in the embodiment. The value of index I is shown by a small letter i hereinbelow. The curves are expressed by the equation (6) when it is assumed that the appearance probability of LPS is set to q and an approximate probability upon encoding is set to $q_{ei}$. The indices I of 1, 2, 3, ... are sequentially given to the values of the appearance probabilities q of LPS in accordance with the order from the larger value to the smaller value.

$$\eta = \frac{-q\log_2 q - (1-q)\log_2(1-q)}{-q\log_2 q_{ei} - (1-q)\log_2(1-q_{ei})} \quad (6)$$

In the equation (6), the numerator denotes an entropy and $q_{ei}$ is set to a value shown by the equation (7).

$$q_{ei} = q_1 + q_2 \quad (7)$$

The values of $q_1$ and $q_2$ correspond to the values of the polynomial approximation of the power of 2 and are given by Table 4 as shown in, for example, (8) to (10).

$$q_{e1}' = 2^{-1} \quad (8)$$

$$q_{e2}' = 2^{-1} \cdot 2^{-4} \quad (9)$$

$$q_{e3}' = 2^{-2} + 2^{-3} \quad (10)$$

In the above probabilities, $q_{ei}$ at a peak point at which an efficiency $\eta$ is set to 1.0 is hereinafter called an effective probability. An intersection point of the efficiency curves is called a boundary probability $q_{bi}$. It will be obviously understood that the efficiency is improved by a method of encoding by using the adjacent effective probabilities around the boundary probability as a center.

In the embodiment, as shown in the equation (5), the effective probability $q_{ei}$ shown in FIG. 15 is selected from the probabilities which can be approximated by two terms. Q1, Q2, and Q3 of FIG. 5 are parameters Qc 311 which are sent to the arithmetic encoder 78. That is, Q1 and Q2 denote shift amounts which are given to the shift register. The power of 2 is calculated by the shift operations. Q3 indicates a coefficient of the second term and the switching between + and − is executed.

The values of MC in Table 1 are determined in the following manner.

That is, when the number of LPSs assumes $N_L$ and the number of MPSs assumes $N_M$, the generation probability of LPS is given by the equation (11).

$$q = \frac{N_L}{N_M + N_L} \quad (11)$$

By solving the equation (11) with respect to $N_M$, the equation (12) is derived.

$$N_M = |N_L(1/q - 1)| \quad (12)$$

$|x|$ denotes a process to raise the figures below decimal to a unit. By giving $q_{bi}$ shown in FIG. 10 to q in the equation (12), the number $N_{Mi}$ of more priority symbols (MPS) is calculated. Therefore, MC is calculated from the equation (13).

$$MC_i = N_{Mi+1} - N_{Mi} \quad (13).$$

The values of MC in FIG. 12 are obtained by calculating the equations (11), (12), and (13) by assuming that $N_L = 2$.

As mentioned above, the number $N_{Mi}$ of more priority symbols MPS corresponding to each index I is obtained on the basis of each boundary probability $q_{bi}$ as shown in FIG. 8. A difference between the numbers $N_M$ of more priority symbols of the adjacent indices is set to MC for each index I.

The value of MC is compared with the number of more priority symbols MPS generated as mentioned above. When they coincide, such a state is determined to be a state in which the encoding using the adjacent index I is suitable, so that the index I is changed. Consequently, the index I is changed at a proper timing on the basis of the number of more priority symbols MPS generated and the encoding using the optimum index I can be adaptively accomplished.

Figure 9:
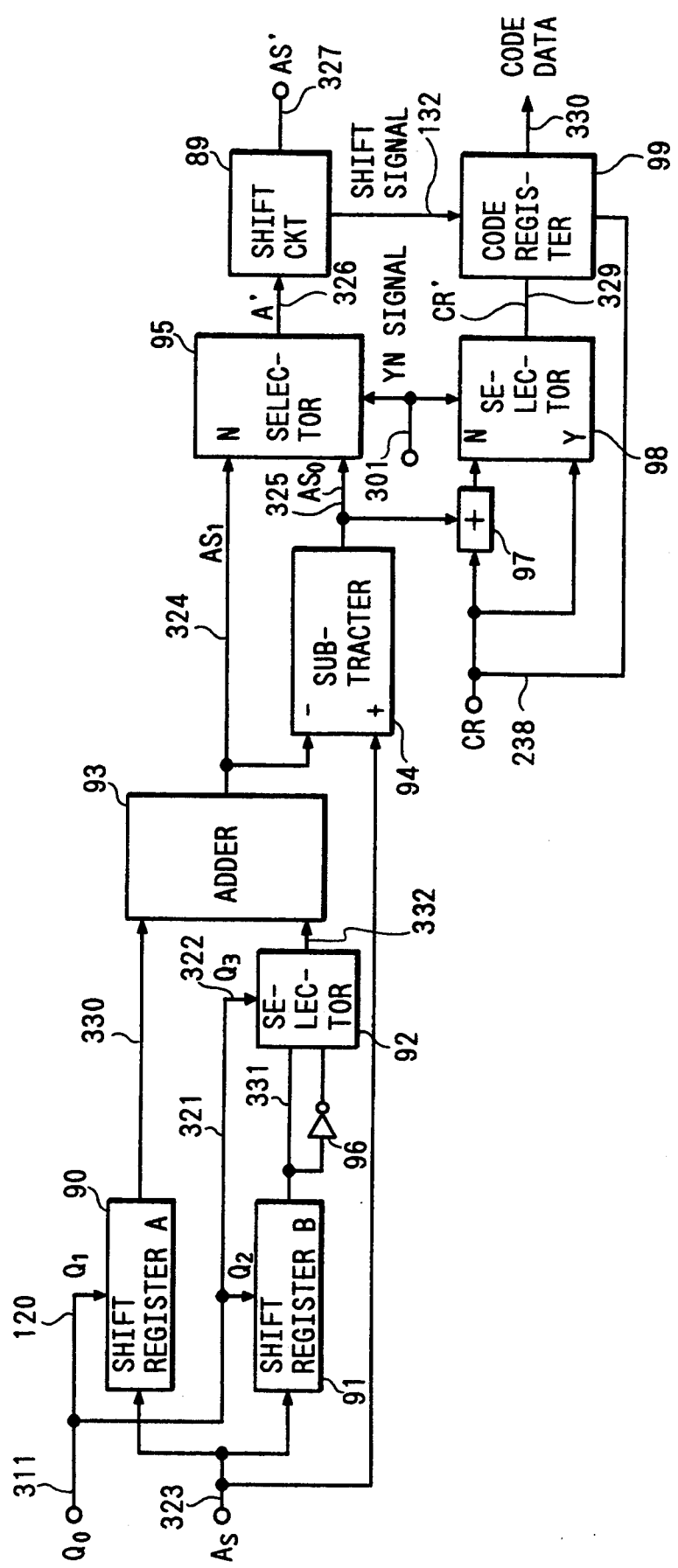
FIG. 9 is a block diagram of an arithmetic encoder.

FIG. 9 is a block diagram of the arithmetic encoder 78.

In the control signal Q311 (FIG. 15) determined by the encode parameter determination circuit 76, Q1 is supplied to a shift register A 90, Q2 is supplied to a shift register B 91, and Q3 is supplied to a selector 92. Q1 and Q2 indicate by which number of bits an Augend signal As 323 is shifted to the right for the shift registers A and B. The results of the shift are generated as output signals 330 and 331.

A complementary number of the signal 331 is obtained by an inverter 96. The selector 92 selects either the signal 331 or an output signal of the inverter 96 in accordance with a control signal Q3, so that an output signal 332 is derived. An adder 93 adds the signal 330 from the shift register A 90 and the signal 332 from the selector 92 and generates an $A_{S1}$ signal 324. A subtracter 94 subtracts the $A_{S1}$ signal 324 from the As signal 323, thereby obtaining an $A_{S0}$ signal 325. A selector 95 selects either the $A_{S0}$ signal 325 or the $A_{S1}$ signal 324 by the YN signal 301. That is, the $A_{S0}$ signal is selected when the YN signal is equal to 1. The $A_{S1}$ signal is selected when the YN signal is equal to 0. Thus, the selected signal is generated as an A′ signal 326. A shift circuit 89 executes a process to shift to the left until the MSB of the A′ signal is equal to 1. An AS′ signal 327 is derived by the shifting process. The shift signal 332 corresponding to the number of shifting processes is supplied to a code register 99. The bits of the number corresponding to the number of shifting processes are sequentially generated from the code register 99 in accordance with the order from the MSB, so that the code data 330 is derived.

The code data 330 is processed by a bit processing method (not shown) in a manner such that the number of continuous bits 1 is set to a finite value.

A content CR 328 of the code register 99 is added to the $A_{S0}$ signal 325 by an adder 97 and a resultant data is supplied to a selector 98. The signal CR 328 to which the $A_{S0}$ signal 325 is not added is also supplied to the selector 98. From the selector 98, a CR′ signal 329 is generated. The CR′ signal 329 is set to CR when the YN signal 301 is equal to 1 and is set to CR $+A_{S0}$ when the YN signal is equal to 0. The foregoing shifting process regarding the code register 99 is also executed for the CR′ signal.

The binary RGB color encode data (code data 330 shown in FIG. 9) produced as mentioned above is stored into the binary image encode data storage unit 23 through a data line 110 shown in FIG. 1.

Figure 10:
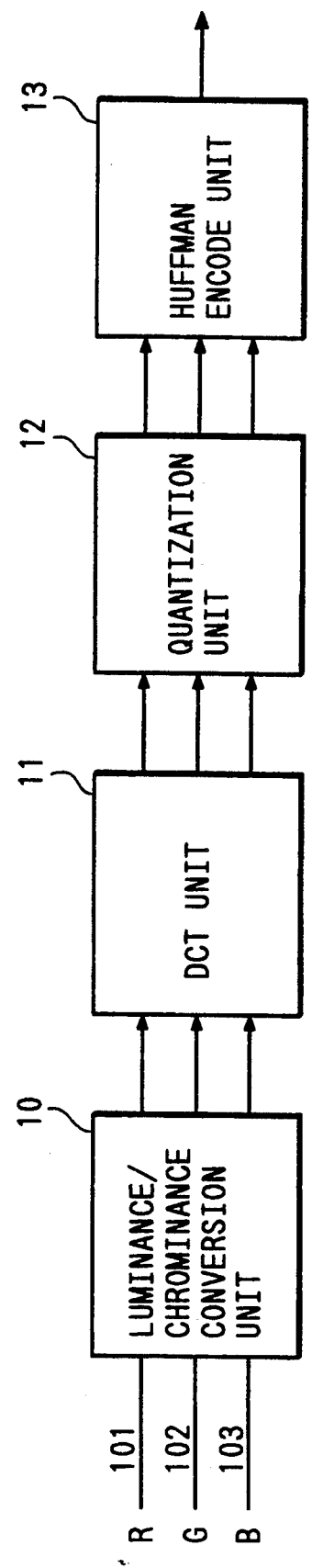
FIG. 10 is a block diagram of a multilevel color image encode unit.

FIG. 10 is a block diagram of the multilevel color image encode unit 24 shown in FIG. 1. The gradation data 101, 102, and 103 of RGB each consisting of eight bits which are supplied from the color image input unit 20 in FIG. 1 are converted into the YUV signals by a luminance/chrominance conversion unit 10 of FIG. 10 by the following conversion equations.

EY=0.299*(R/255)+0,587*(G/255)
+0.114*(B/255)
EU=0.713*(R/255-EY)

EV=0.564*(B/255-EY)
Y=219*EY+16
U=224*U+128
V=224*V+128
(R, G, B: integers of 0 to 255, EY, EU, EV: standardized real number values of 0 to 1)

The YUV signals are subjected to a two-dimensional discrete cosine transformation in a DCT circuit 11 and separated every spatial frequency component. The spatial frequency components are called DCT conversion coefficients. A converting equation of the discrete cosine transformation is shown below.

$$F(u, v) = (1/4)C(u)C(v) \sum_{i=0}^{7} \sum_{j=0}^{7} f(i, j) \cdot \cos(2i + 1)u\pi/16 \cdot \cos(2j + 1)v\pi/16$$

A linear quantization is executed by a quantization every coefficient. In the quantization, different steps are executed every coefficient, thereby providing quantizing characteristics such that the low frequency side is fine and the high frequency side is coarse.

The RGB data are subsequently divided into the DC component and the AC component by a Huffman encode unit 13 and respective Huffman codes are allocated. A difference between the DC component and the DC component of the preceding block is calculated and a Huffman code is given for a differential value. As for the AC component, a Huffman code is allocated to the coefficient values of zero-run and non-zero of the coefficient of the AC component which has been zigzag scanned. After all of the coefficient values in the block were completely transmitted, EOB (End of Block) is allocated to the last of the block data.

The code data is stored into the multilevel image encode data storage unit 25 through a data line 111 in FIG. 1.

Figure 11:
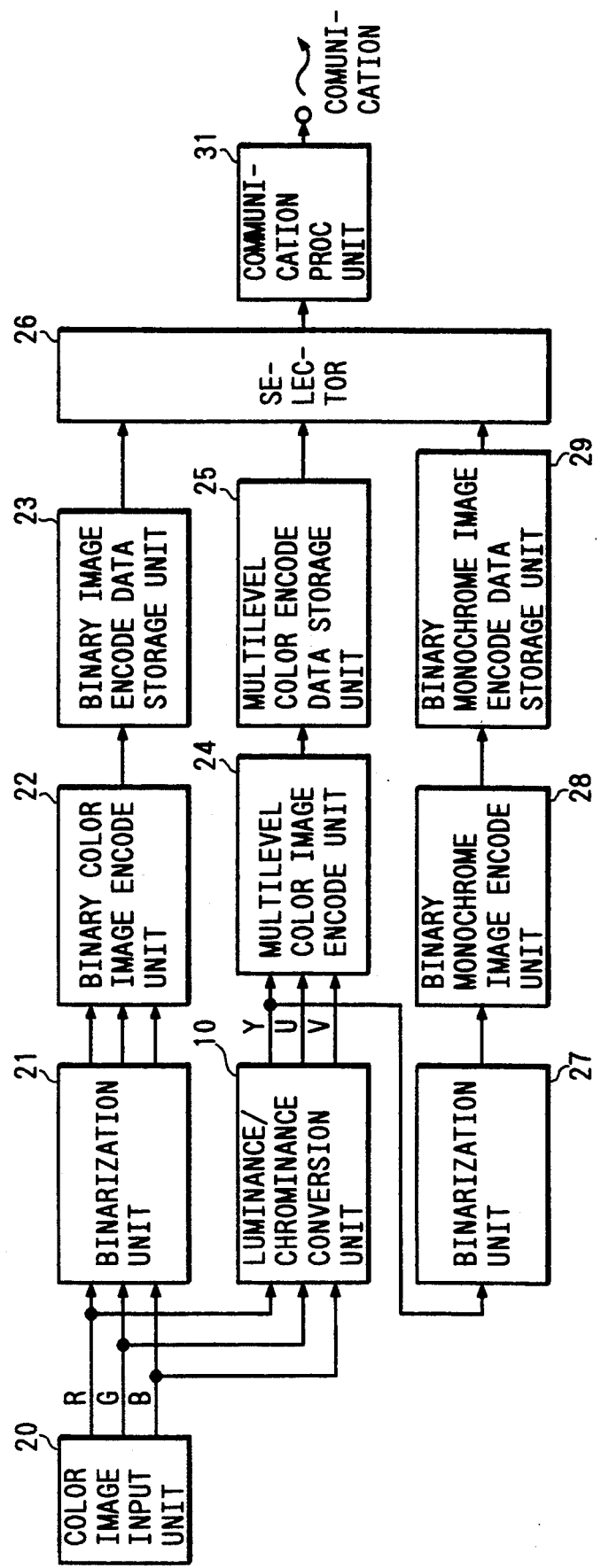
FIG. 11 is a diagram showing another embodiment.

According to the embodiment as described above, the color image is supplied form the color image input unit 20 in FIG. 1 and are simultaneously encoded by two kinds of encode units which are constructed in parallel, namely, by the binary color image encode unit 22 and the multilevel color image encode unit 24. The encoded image data are respectively stored into the binary image encode data storage unit 23 and the multilevel image encode data storage unit 25 and, after that, the image suitable for transmission is selected and transmitted. In the encoding of the embodiment, although the binary color image encoding and the multilevel color image encoding have been used, the invention can be also realized by using another encoding. FIG. 11 shows an example in such a case.

In FIG. 11, the blocks having the same functions as those shown in FIG. 1 are designated by the same reference numerals. In the example, the color image is read by the color image input unit and is simultaneously encoded by three kinds of encoding systems. The encoded three kinds of data are stored into a data storage units, and the optimum image data is selected. Two of the three encoding systems are the binary color image encoding system and the multilevel color image encoding system as described in FIG. 1.

For instance, a black/white binary image encoding system is considered as the third encoding system. After the input color image data RGB were converted into the YUV data by the luminance/chrominance conversion unit 10 (having the same function as that of the conversion unit in FIG. 10), only the luminance Y data is binarized by a binarization unit 37, thereby producing the black/white binary image data. The black/white binary image data is encoded by a binary color image encode unit 38. The encoded data is stored into a binary monochrome image encode data storage unit 39. Thus, the optimum image to be transmitted as mentioned above can be selected. As a binary monochrome image encoding system, an MH system, an MR system, or the like which is generally widely used can be used. On the other hand, the dynamic arithmetic encoding in the embodiment can be applied to a single color (monochromatic color; black/white). That is, it is sufficient to apply the circuit of R described in FIG. 3 to the black/white binary value.

The monochrome binary encoding system is selected, for instance, in the case where the reception side has only an MH or MR decoding ability or the case of a black/white document or the like.

As described above, according to the embodiment of the invention, the color image is simultaneously encoded by a plurality of different encoding systems and temporarily stored into a storage device such as a disk or the like. Before the image is transmitted, each encode data is decoded and confirmed by a display or the like, so that the encoding system which is optimum to the color image can be promptly selected and the color image can be transmitted. On the other hand, by confirming each encode data length before transmission, the optimum encoding system can be also selected. Further, in the case where the reception side as a partner side has a decoding ability of only one encoding system, the color image can be soon transmitted after confirmation of a protocol, so that there is no need to again encode.

According to the embodiment of the invention, therefore, the color image can be promptly compressed and transmitted by the encoding system which is optimum to the color image to be transmitted.

The present invention is not limited to the foregoing embodiments but many modifications and variations are possible within the spirit and scope of the appended claims of the invention.

What is claimed is:

1. An image encoding apparatus comprising:
input means for inputting image data representing an original;
first encoding means for encoding the image data as binary image data representing the original;
second encoding means for encoding the image data as multilevel image data representing the original;
selecting means for selecting one of the image data encoded by said first or second encoding means; and
transmitting means for transmitting the image data selected by said selecting means,
wherein said first encoding means encodes the image data as binary image data line by line and said second encoding means encodes the image data as multilevel image data block by block, each block being a two-dimensional block having a plurality of pixels, and
wherein said first encoding means and said second encoding means encode the same image data of one original in parallel.

2. An apparatus according to claim 1, further having decoding means for decoding the image data encoded by said first and second encoding means.

3. An apparatus according to claim 2, further having display means for displaying the image data decoded by said decoding means.

4. An apparatus according to claim 1, wherein said selecting means includes setting means for manually performing the selection.

5. An apparatus according to claim 1, wherein said selecting means performs the selection in accordance with an apparatus on the transmission side.

6. An apparatus according to claim 5, wherein said selecting means performs the selection in accordance with a protocol with said apparatus.

7. An apparatus according to claim 1, wherein said first encoding means performs an entropy encoding.

8. An apparatus according to claim 1, wherein said second encoding means performs the encoding using an orthogonal transformation.

9. An image encoding method comprising:
input step of inputting image data representing an original;
first encoding step of encoding the image data as binary image data representing the original;
second encoding step of encoding the image data as multilevel image data representing the original;
selecting step of selecting one of the image data encoded by said first or second encoding step; and
transmitting step of transmitting the image data selected by said selecting step,
wherein said first encoding step encodes the image data as binary image data line by line while said second encoding step encodes the image data as multilevel image data block by block, each block being a two-dimensional block having a plurality of pixels, and
wherein said first encoding step and said second encoding step encode the same image data of one original in parallel.

10. An image encoding apparatus comprising:
input means for inputting image data representing an original;
first encoding means for encoding the image data as binary image data representing the original;
second encoding means for encoding the image data as multilevel image data representing the original; and
memory means for storing the image data encoded by said first encoding means and said second encoding means in parallel,
wherein said first encoding means encodes the image data as binary image data line by line while said second encoding means encodes the image data as multilevel image data block by block, each block being a two-dimensional block having a plurality of pixels, and
wherein said first encoding means and said second encoding means encode the same image data of one original in parallel.

11. An apparatus according to claim 10, further having decoding means for decoding the image data encoded by said first and second encoding means.

12. An apparatus according to claim 11, further having display means for displaying the image data decoded by said decoding means.

13. An apparatus according to claim 10, wherein said first encoding means performs an entropy encoding.

14. An apparatus according to claim 10, wherein said second encoding means performs the encoding using an orthogonal transformation.

15. An image encoding method comprising:
input step of inputting image data representing an original;
first encoding step of encoding the image data as binary image data representing the original;
second encoding step of encoding the image data as multilevel image data representing the original; and
storing step of storing the image data encoded by said first encoding step and said second encoding step in parallel,
wherein said first encoding step encodes the image data as binary image data line by line while said second encoding step encodes the image data as multilevel image data block by block, each block being a two-dimensional block having a plurality of pixels, and
wherein said first encoding step and said second encoding step encode the same image data of one original in parallel.

16. An image encoding apparatus comprising:
input means inputting color image data representing an original;
first encoding means for encoding the image data as color image data representing an original;
second encoding means for encoding the image data as monochromatic image data representing the original;
memory means for storing the image data encoded by said first encoding means and said second encoding means in parallel;
selecting means for selecting one of the image data encoded by said first or second encoding means and stored in said memory means; and
transmitting means for transmitting the image data selected by said selecting means,
wherein said second encoding means encodes the color image data as monochromatic image data line by line while said first encoding means encodes the color image data as color image data block by block, each block being a two-dimensional block having a plurality of pixels, and
wherein said first encoding means and said second encoding means encode the same color image data of one original in parallel.

17. An apparatus according to claim 16, further having decoding means for decoding the image data encoded by said first and second encoding means.

18. An apparatus according to claim 17, further having display means for displaying the image data decoded by said decoding means.

19. An apparatus according to claim 16, wherein said selecting means includes setting means for manually performing the selection.

20. An apparatus according to claim 16, wherein said selecting means performs the selection in accordance with an apparatus on the transmission side.

21. An apparatus according to claim 20, wherein said selecting means performs the selection in accordance with a protocol with said apparatus.

22. An apparatus according to claim 16, wherein said first encoding means performs an entropy encoding.

23. An apparatus according to claim 16, wherein said second encoding means performs the encoding using an orthogonal transformation.

24.
input step of inputting image data representing an original;

first encoding step of encoding the image data as color image data representing the original;

second encoding step of encoding the image data as monochromatic image data representing the original; and storing step of storing the image data encoded by said first encoding step and said second encoding step in parallel, wherein said second encoding step encodes the color image data as monochromatic image data line by line while said first encoding step encodes the color image data as color image data block by block, each block being a two-dimensional block having a plurality of pixels, and wherein said first encoding step and said second encoding step encode the same color image data of one original in parallel.

* * * * *

UNITED STATES PATENT AND TRADEMARK OFFICE
CERTIFICATE OF CORRECTION

PATENT NO. : 5,363,219
DATED : November 8, 1994
INVENTOR(S) : TADASHI YOSHIDA

It is certified that error appears in the above-identified patent and that said Letters Patent is hereby corrected as shown below:

COLUMN 2

Line 19, "either better" should read --either--.

COLUMN 4

Line 18, "form" should read --from--.

COLUMN 5

Line 9, "total" should read --a total of--.

COLUMN 6

Line 16, "Corn." should read --Com.--.

COLUMN 7

Line 29, "he" should read --the--.

UNITED STATES PATENT AND TRADEMARK OFFICE
CERTIFICATE OF CORRECTION

PATENT NO. : 5,363,219

DATED : November 8, 1994

INVENTOR(S) : TADASHI YOSHIDA

It is certified that error appears in the above-identified patent and that said Letters Patent is hereby corrected as shown below:

COLUMN 14

Line 66, "24." should read --24. An image encoding method comprising:--.

Signed and Sealed this

Sixteenth Day of May, 1995

BRUCE LEHMAN

*Attest:*

*Attesting Officer*        *Commissioner of Patents and Trademarks*